(12) United States Patent
Mesko et al.

(10) Patent No.: US 7,798,686 B2
(45) Date of Patent: Sep. 21, 2010

(54) FENDER TAB AND LOCATING CRADLE

(75) Inventors: Jeffrey Alan Mesko, Farmington Hills, MI (US); Carlos Gerardo Navarro Zavala, Farmington Hills, MI (US); Thomas W. Schumacher, Farmington Hills, MI (US); Kent J. Agne, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 449 days.

(21) Appl. No.: 12/047,077

(22) Filed: Mar. 12, 2008

(65) Prior Publication Data

US 2009/0231872 A1 Sep. 17, 2009

(51) Int. Cl.
*B60Q 1/04* (2006.01)
(52) U.S. Cl. ........................................ 362/507; 362/549
(58) Field of Classification Search .................. 362/487, 362/505–507, 515, 525, 528, 284, 289, 368, 362/549; 296/193.08, 193.09, 198, 203.02, 296/203.04
See application file for complete search history.

(56) References Cited

U.S. PATENT DOCUMENTS

| 4,318,161 | A | | 3/1982 | Shanks |
| 4,994,942 | A | | 2/1991 | Georgeff |
| 5,424,923 | A | | 6/1995 | Young et al. |
| 5,497,301 | A | * | 3/1996 | McMahan et al. ........... 362/524 |
| 6,390,658 | B2 | * | 5/2002 | Maeda ....................... 362/546 |
| 6,793,359 | B2 | | 9/2004 | Iwamoto |
| 6,951,365 | B2 | | 10/2005 | Chase et al. |

* cited by examiner

*Primary Examiner*—Hargobind S Sawhney
(74) *Attorney, Agent, or Firm*—Young Basile

(57) ABSTRACT

A light assembly for a vehicle includes a light unit having a housing and a lens attached to the housing. A cradle is disposed on the housing, and the cradle includes a first guide surface. A body panel includes a cantilevered portion, and the cantilevered portion includes a tab projecting from an interior side of the cantilevered portion. The tab is configured to be slidably disposed adjacent the first guide surface to locate the cantilevered portion relative to the light unit.

20 Claims, 3 Drawing Sheets

US 7,798,686 B2

FENDER TAB AND LOCATING CRADLE

FIELD OF THE INVENTION

The present invention pertains to the field of automotive lights, and more particularly to devices for securing outthrusts on body panels.

BACKGROUND

Wraparound light assemblies for vehicles include a lens having surfaces facing two directions, such as a vehicle front direction and a vehicle side direction, or a vehicle rear direction and a vehicle side direction. A housing attached to the lens encloses electronics and other components of the light assembly. Some wraparound lights are designed to have an aggressive or sporty shape for aesthetic reasons. When installed, the lens abuts a body panel of the vehicle.

SUMMARY

In one disclosed embodiment, a light assembly is provided for a vehicle body. The light assembly includes a light unit, a cradle, and a body panel including a tab. The light unit includes a housing and a lens attached to the housing. The cradle is disposed on the housing, and the cradle includes a first guide surface. The body panel includes a cantilevered portion, and the tab projects from an interior side of the cantilevered portion. The tab is configured to be slidably disposed adjacent to the first guide surface to locate the cantilevered portion relative to the light unit.

In another embodiment, a light assembly is provided for a vehicle. The light assembly includes a housing, a cradle attached to the housing, a lens attached to the housing, and a body panel attached to the housing. The cradle includes a slot defined by two spaced apart surfaces. The lens has a primary light emitting surface and a secondary light emitting surface at an angle relative to the primary surface, and the secondary surface includes two spaced apart projections separated by a recess. The body panel has a side panel including a substantially V-shaped edge defining an outthrust, and the outthrust has a portion that is substantially flush with at least a portion of the secondary surface. The body panel also includes a tab projecting from the outthrust, and the tab is slidably engaged with the slot.

In another embodiment, a cradle is provided for securing a tab projecting from an outthrust defined by a V-shaped edge of a body panel to a light assembly on a vehicle. The cradle includes a first portion that is contoured to the shape of the light assembly, and the first portion is configured to be attached to the light assembly. The cradle also includes a second portion, with the second portion including two spaced apart surfaces defining a slot configured to be slidably engaged by the tab.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
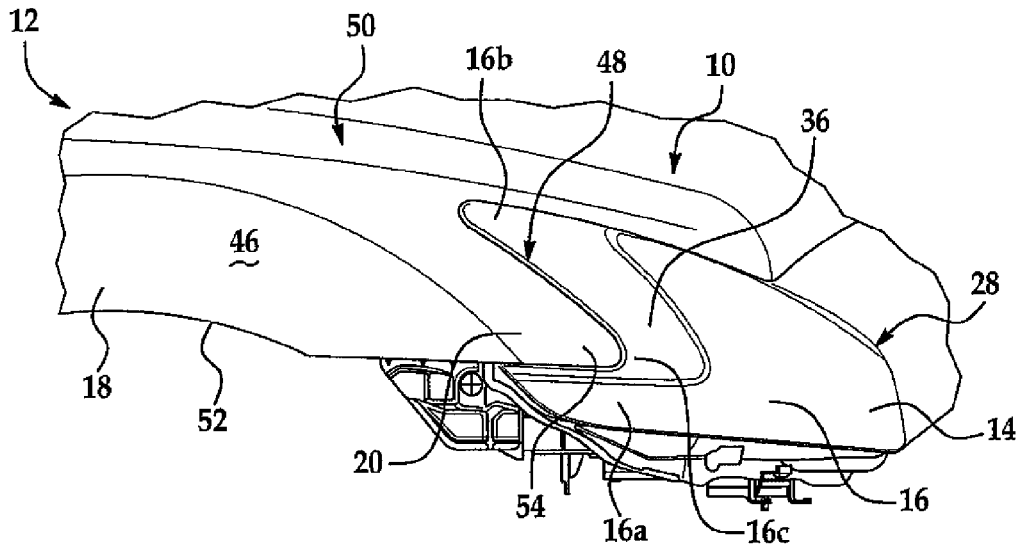
FIG. 1 is a perspective view of a vehicle with a wraparound light assembly having an aggressive or sporty lens shape.

A wraparound light assembly with an aggressive or sporty lens design can improve the appearance of a vehicle. However, implementing an aggressive or sporty lens design is problematic. For example, FIG. 1 illustrates a wraparound light assembly 10 for a vehicle 12. The light assembly 10 includes a lens 14 with a side-facing portion 16 having two spaced apart projections 16a, 16b. For proper fit and finish, a body panel 18 abutting the lens 14 includes an outthrust 20 that flushly abuts at least a portion 16c the lens 14 when installed. The outthrust 20 can not be secured directly to the lens 14 due to the brittleness of the lens 14 material. If unsecured, the outthrust 20 can be bent with minimal force, as the body panel 18 is often made of thin sheet metal, and the position of the outthrust 20 cannot be controlled with sufficient accuracy for an optimal fit and finish. Thus, an unsecured outthrust 20 degrades the appearance of the vehicle 12. Due to the difficulty of securing the outthrust 20, among other reasons, designers have avoided aggressive or sporty lens 14 shapes.

Figure 2:
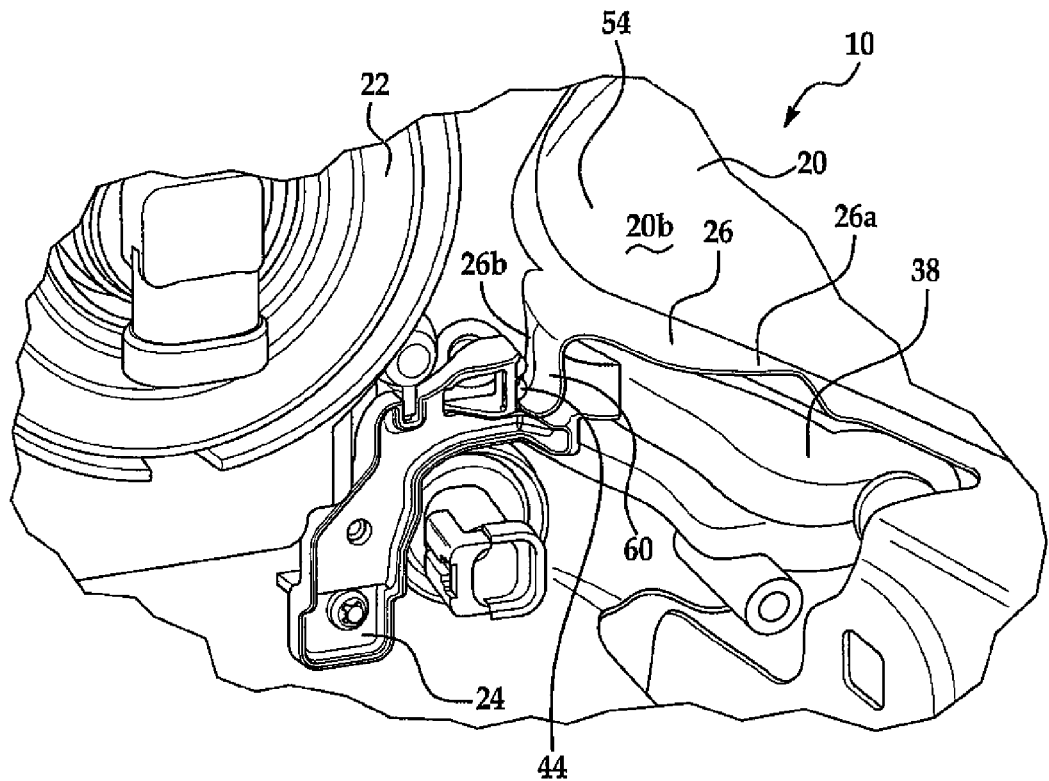
FIG. 2 is a perspective view of the interior of a light assembly having a cradle attached to a housing and a tab projecting from a body panel and engaging a slot in the cradle.

To overcome the problems associated with aggressive or sporty lens 14 designs, a light assembly 10 as recited in the claims is provided. As illustrated in FIG. 2, the light assembly 10 includes a housing 22, a cradle 24 attached to the housing 22, and a tab 26 projecting from an interior side 20b of the outthrust 20 and slidably engaged with the cradle 24.

Figure 3:
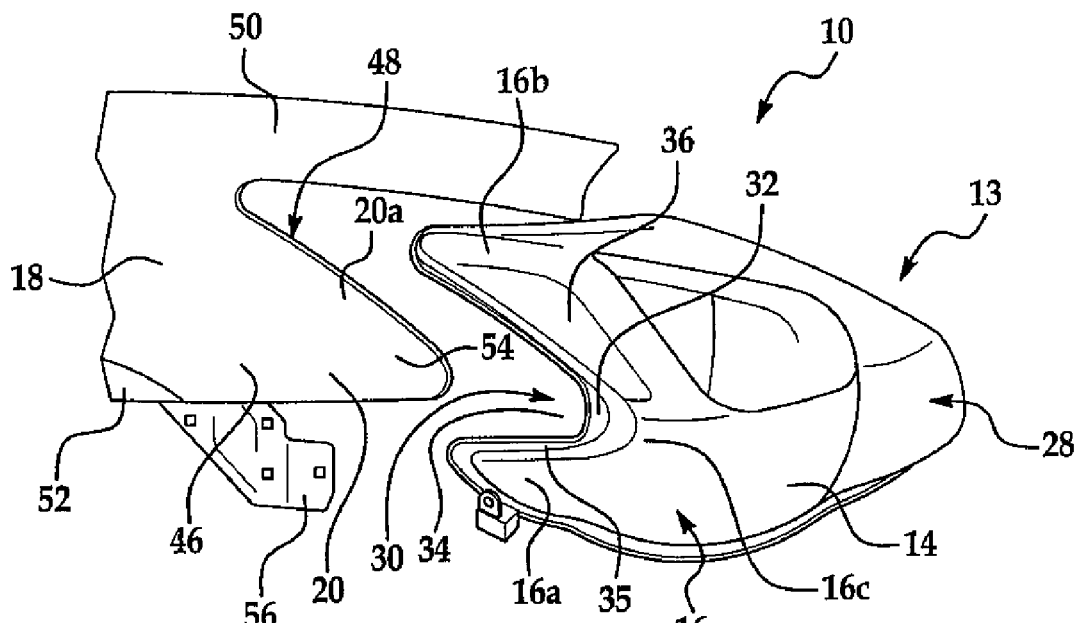
FIG. 3 is an exploded view of the body panel and the lens and housing.

As illustrated in FIG. 3, the lens 14 has a primary light emitting surface, shown as a front-facing surface 28, and a secondary light emitting surface, shown as the side-facing surface 16. The primary light emitting surface often emits a greater amount of light than the secondary light emitting surface. While the primary light emitting surface can face squarely to the front or rear of the vehicle 12 and the secondary light emitting surface can be angled ninety degrees relative to the primary surface to face squarely to the side of the vehicle 12, modem vehicles generally include much more streamlined lens 14 designs. As such, the primary light emitting surface and secondary light emitting surface can be angled relative to the front/rear facing direction and side facing direction, respectively, and the bend between the primary light emitting surface and secondary light emitting surface can exceed ninety degrees. Moreover, neither light emitting surface need be a plane. Often, the lens 14 will be contoured to conform to a streamlined vehicle design. As such, the surfaces are not necessarily parallel or perpendicular to the direction light is emitted.

The side-facing surface 16 includes two spaced apart projections 16a, 16b separated by a recess 30. The projections 16a, 16b can narrow as they extend toward the opposing end of the vehicle 12, though the exact shape of the projections 16a, 16b can vary depending on desired appearance of the vehicle 12. For example, the projections 16a, 16b can stay the same width as they extend, or the projections 16a, 16b can include sharp angles or steps in alternative to the illustrated smooth, flowing shape. The recess 30 can include a depression 32 in the lens 14 that is at least as deep as the thickness of the outthrust 20 on the body panel 18, though for tolerance reasons the depression 32 can be deeper. The recess 30 can include a cutout 34 between the projections 16a, 16b, or the depression 32 can be spanned by lens 14 material. If the depression 32 is spanned by material, a slot or other aperture (not shown) can be included to accept the tab 26 on the outthrust 20 of the body panel 18. Though the projections 16a, 16b as illustrated extend substantially horizontally, the projections 16a, 16b can extend in an alternative direction, such as at an approximately forty five degree angle relative to the horizon, vertically, or in other directions. For example, the recess 30 can be on the front-facing surface 28 of the lens 14 if the outthrust 20 is a portion of the hood of the vehicle 12. Also, the lens 14 can include at least one flange 35 for connection to the housing 22. As illustrated, the flange 35 extends from the lower projection 16a and is substantially perpendicular to an adjacent portion of the projection 16a. Alternatively, the flange 35 can extend from a different portion of the lens 14, such as the projection 16b or the bottom side as illustrated of the projection 16a.

The lens 14 can be made of a transparent or translucent plastic, such as polycarbonate, a talc filled polycarbonate, PMMA, or any other material recognized as suitable by one of skill in the art having knowledge of the present application. If the lens 14 is used for a headlight, it can be made of a plastic such as polycarbonate with a talc filler, which is capable of providing support for adjacent components and can be coated for chip resistance. The lens 14 when used in a taillight is not generally subject to forces as great as a lens 14 in a headlight, so the lens 14 in a taillight can be made of less expensive materials such as PMMA, which is heat weldable for connection to the housing 22 or other components. Additionally, the entire lens 14 need not be made of a single material. For example, the lens 14 can include a side marker 36 that is a different material, or a separate piece dyed a different color and attached to the remainder of the lens 14.

The lens 14 can be attached to the housing 22 to form a light unit 13. The housing 22, in conjunction with the lens 14, encloses at least one lamp and its components. Because the components can be sensitive to moisture, the housing 22 can be sealingly attached to the lens 14. The seal can be created by gluing the flange 35 of the lens 14 to a glue track 38 included in the housing 22. The glue track 38 can be, as illustrated, an elongated platform portion of the housing 22 extending substantially parallel to an adjacent portion of the lens 14, such as the flange 35. This arrangement permits the flange 35 to be narrow and, therefore, reduce the likelihood that the flange 35 will fracture. Additionally, the glue track 38 can be straight or include a slight curve corresponding to a curve in the adjacent portion of the lens 14. The glue track 38 can be formed integrally with the housing 22 or formed separately and attached after formation. The glue track 38 need not have a planar top surface, though the top surface or side surface of the glue track 38 should correspond with the shape of the flange 35 on the lens 14 for optimal sealing. The housing 22 can extend along at least a portion of the projections 16a, 16b, though it need not. The exact shape of the housing 22 depends on the configuration of the lens 14, the lamp, and other components. The housing 22 can have a complex shape with many bends, protrusions, and other geometries. The housing 22 can be made from ASA or any other material recognized as suitable by one of skill in the art having knowledge of the present application.

Figure 4:
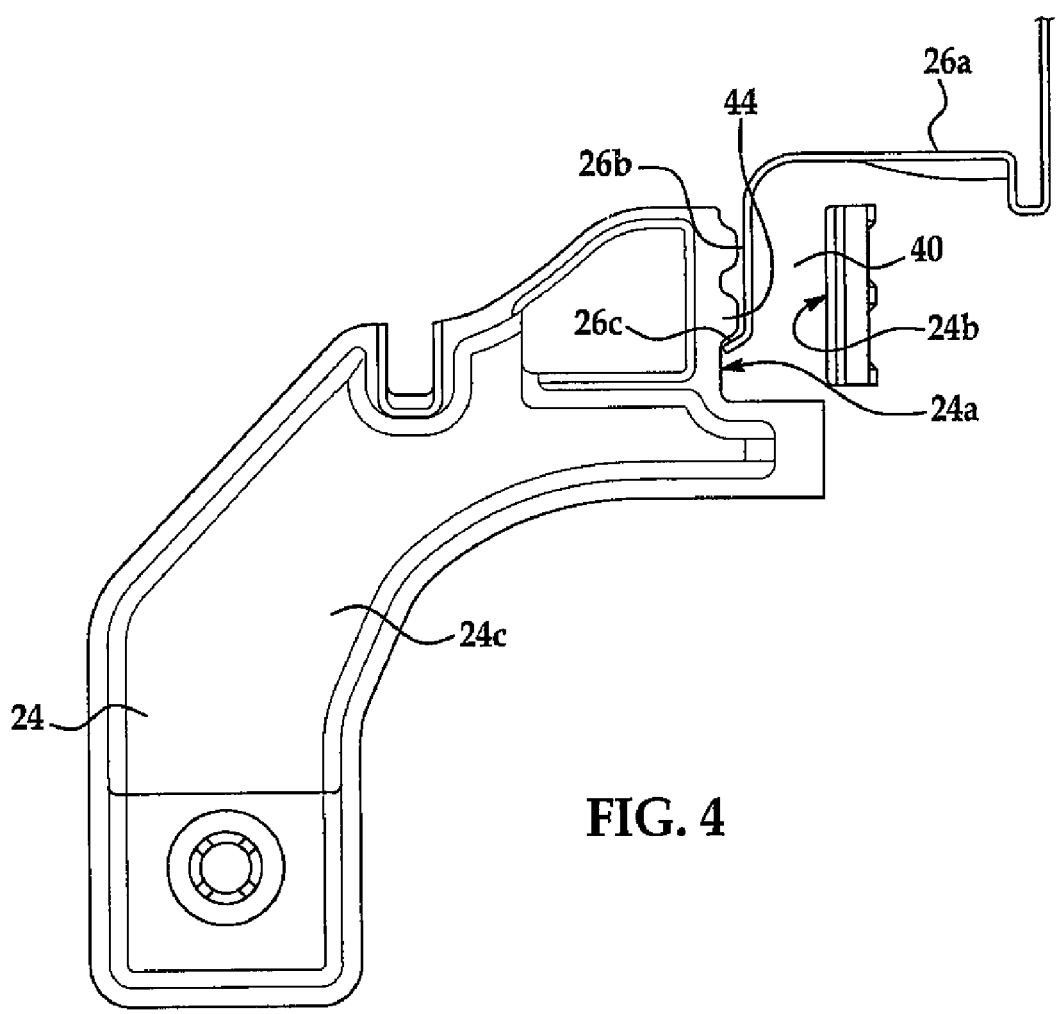
FIG. 4 is a rear view of a cradle and an embodiment of the tab.

As illustrated in FIG. 2, the cradle 24 is attached to the housing 22. FIG. 4 illustrates the cradle 24 in greater detail. The cradle 24 as illustrated includes a slot 40 defined by two spaced apart surfaces 24a, 24b. The slot 40 can be oriented to prevent movement of the outthrust 20 in the vehicle 12 width direction, i.e., the surfaces 24a, 24b can be aligned substantially parallel to the length of the vehicle 12. Alternatively, the slot 40 can be oriented in different directions, for example with the surfaces 24a, 24b aligned parallel to the width of the vehicle 12. The slot 40 can be sized such that when the tab 26 is inserted, a gap substantially equal to a tolerance exists between each side of the tab 26 and the surfaces 24a, 24b of the slot. Thus, the tab 26 cannot move outside its tolerance.

Alternatively, the cradle 24 can include only one surface, e.g., one of 24a and 24b. In this case, the cradle 24 may only protect movement of the outthrust 20 in one direction. For example, if only surface 24b is included, there is no surface such as 24a to prevent the outthrust from moving in a direction away from surface 24b. However, even if only one surface, e.g. one of 24a and 24b, is included the outthrust 20 can be prevented from movement in multiple directions because another object, such as the depression 32, can prevent inward movement of the outthrust 20.

Figure 6:
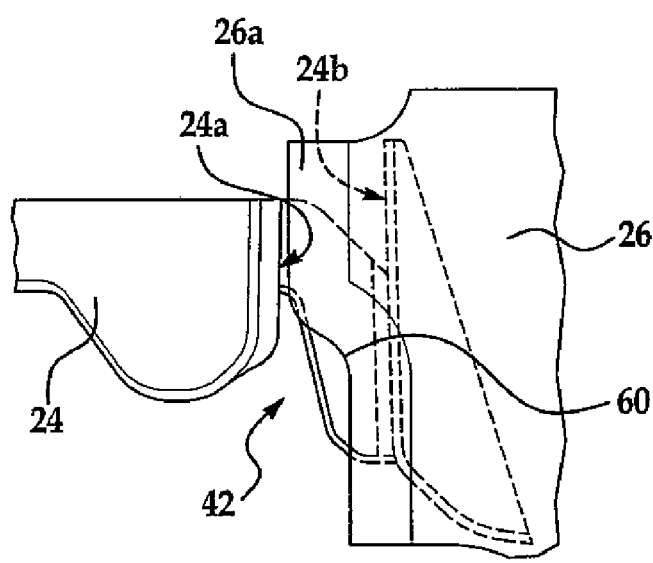
FIG. 6 is a top view of a portion of the cradle and the tab of FIG. 5.

The slot 40 can additionally include a tapered opening 42 as illustrated in FIG. 6. The tapered opening 42 can narrow in width along a length of the slot 40 extending in the direction the tab 26 is slid. The tapered opening 42 simplifies assembly because the slot 40 can self-locate the tab 26 with respect to the housing 22. The cradle 24 can also include at least one ridge 44 running a length of the slot 40 as illustrated in FIG. 4. The ridge 44 can limit the tab 26 from moving relative to a depth of the slot 40, i.e., in the vehicle 12 height direction as illustrated, by contacting a bend 26c in the tab 26 if the tab 26 is moved toward the ridge 44.

The cradle 24 can be molded integrally with the housing 22, or formed separately and attached to the housing 22. If formed separately, the cradle 24 can be shaped to conform to the contours of the housing 22. As such, the cradle 24 can have a complex shape. For example, due to sizing limitations, the location where the slot 40 is disposed can be spaced apart from an available cradle 24 attachment point. In this case, the cradle 24 includes a curved body 24c or is otherwise shaped to conform to the sizing requirements. The cradle 24 can also include flanged edges or similar structures for additional strength. The cradle 24 can have a simpler shape if the location of the connection between the cradle 24 and housing 22 is not limited by the geometry of the housing 22. The cradle 24 can be made of molded plastic, stamped metal, or any other material recognized as suitable by one of skill in the art having knowledge of the present application.

As illustrated in FIG. 3, the body panel 18 has a side panel 46 including a substantially V-shaped edge 48 defining the outthrust 20. The body panel 18 can additionally include a top panel 50 angled relative to the side panel 46, with the top panel 50 forming part of the hood or truck of the vehicle 12. The side panel 18 can additionally include at least part of a fender 52. The fender 52 is typically at an opposing end of the body panel 18 from the outthrust 20.

The outthrust 20 can be a cantilevered portion of the body panel 18. The outthrust has a portion 20a that is substantially flush, i.e., flush within design tolerances, with at least a portion 16c of the side-facing surface 16 of the lens 14. The exact shape of the outthrust 20 can vary from the illustrated V-shape. For example, the outthrust 20 can include sharp corners, have a hook shape, or include a more intricate or ornate design than illustrated. For optimal fit and finish, the shape of the outthrust 20 conforms to the shape of the edges of the projections 16a, 16b adjacent the recess 30. As such, the length of the outthrust 20 corresponds with the length of the recess 30. The body panel 18 can be formed by stamping sheet metal. Alternatively, the body panel 18 can be a composite, such as carbon fiber.

The tab 26 projects from an interior surface of 20b the outthrust 20 as illustrated in FIG. 2. The tab 26 can limit or substantially eliminate movement of the outthrust 20 in the vehicle 12 width and height directions. The tab 26 can project from adjacent a vertex 54 of the outthrust 20. The exact location of the tab 26 can be determined based on the stiffness of the outthrust 20, the location of the slot 40, and the geometry of the lens 14 and housing 22. However, the tab 26 should project from sufficiently close to the vertex 54 of the outthrust 20 that the tip of the outthrust 20 is relative stationary and adequately supported in order to ensure an adequate fit and finish.

The exact shape of the tab 26 can vary depending on the location of the slot 40 and geometry of the housing 22 and lens 14. For example, if the housing 22 includes the glue track 38, the tab 26 can include a portion 26a projecting over the glue track 38 so as not to contact the flange 35 of the lens 14 attached to the glue track 38. The portion 26a can extend substantially in the vehicle 12 width direction, beginning on a side of the glue track 38 adjacent the outthrust 20 and extending to adjacent the slot 40. The tab 26 can also include an engaging portion 26b that extends substantially parallel to the surfaces 24a, 24b of the slot 40, which is in the vehicle 12 height direction as illustrated. Movement of the engaging portion 26b can be limited by the surfaces 24a, 24b of the slot 40 to prevent movement of the outthrust 20 in the vehicle 12 width direction.

As illustrated in FIG. 4, the tab 26 can additionally include the bend 26c angled relative to the vehicle 12 height direction at the end of the engaging portion 26b. The bend 26c can be configured to contact either the ridge 44 in the slot 40 or the bottom of the slot 40 to prevent the outthrust 20 from moving in the vehicle 12 height direction as illustrated. Alternatively, a bulged portion, a T-shaped bend, or another shape capable of preventing movement of the tab 26 relative to the depth of the slot 40 can be used in place of the bend 26c. The tab 26 can be formed integrally with the body panel 18 by, for example, stamping the shape of the tab 26 into the body panel 18. Alternatively, the tab 26 can be a separate piece of plastic, composite or metal attached to the body panel 18.

Figure 5:
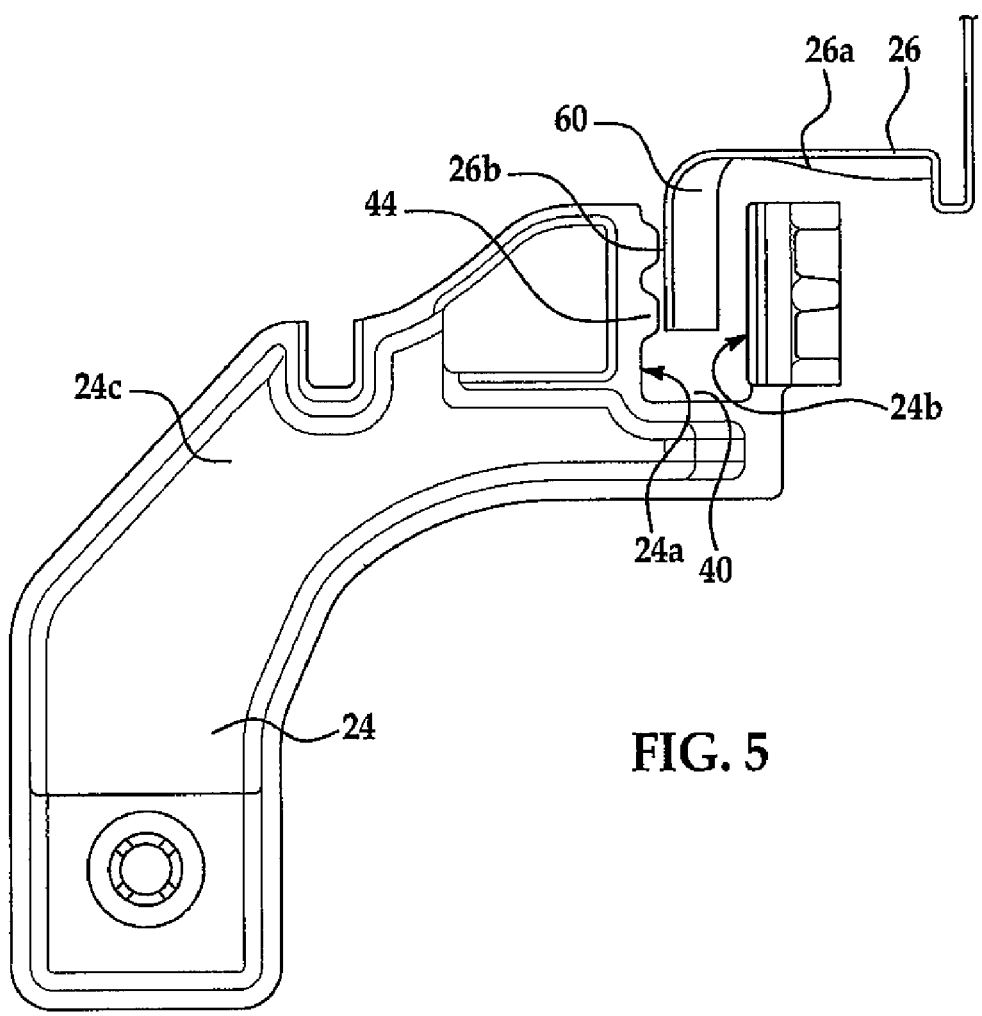
FIG. 5 is a rear view of a cradle and an embodiment of the tab.

As illustrated in FIGS. 5 and 6, the tab 26 can include an S-shaped bend 60 extending in the vehicle length direction. FIG. 5 illustrates the tab 26 including the bend 60 from the side, while FIG. 6 illustrates the bend 60 from above. The bend 60 adds strength to the tab 26. While the illustrated S-shaped bend 60 includes two bends extending parallel to the depth of the slot, the tab 26 can alternatively include one bend or more than two bends. Additionally, the bends can be angled differently from shown, so a tab 26 having two bends can alternatively form a Z-shape.

The body panel 18 can also include at least one flange 56 projecting from the side panel 46, for example, from between the outthrust 20 and the fender 52. Additional or alternative flanges 56 can project from the top panel 50 or other locations on the body panel 18. The flange 56 is an additional connection point for the body panel 18, and can connect the body panel 18 to the housing 22, to another body panel, or to a different portion of the vehicle 12.

The lens 14 can be attached to the housing 22 using fasteners such as screws and clips, as well as through glue and, depending on the lens 14 and housing 22 materials, welding. The cradle 24, if a separate piece, is attached to the housing 22, also using fasteners such as clips or screws, or using glue. The body panel 18 and lens 14 are then slidably engaged such that the tab 26 is disposed between the two surfaces 24a, 24b of the slot 40. The tapered opening 42 can allow the tab 26 to be self-located with respect to the housing 22. The engagement of the tab 26 and slot 40 can permit the outthrust 20 to remain flushly engaged with the lens 14 by preventing the outthrust 20 from moving beyond a tolerance amount in the vehicle 12 width direction and the vehicle height 12 direction. The housing 22 can be connected to the body panel 18 at additional locations, such as the flange 56. Thus, a quality fit and finish of the body panel 18 and lens 14 are achieved even with an aggressively or sporty shaped lens 14.

The light assembly 10 thus permits the lens 14 to include aggressive or sporty shapes while still permitting the body panel 18 to be secured for a quality fit and finish. Additionally, because the placement of the cradle 24 and the tab 26 are flexible, the designs of the lens 14, housing 22, and body panel 18 need not be entirely overhauled to include an aggressive or sporty lens 14 shape. For example, the cradle 24 can be designed for attachment to an existing housing 22 design, if desired, in order to reduce design and manufacturing costs.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A light assembly for a vehicle comprising:
   a light unit including a housing and a lens attached to the housing;
   a cradle disposed on the housing, the cradle including a first guide surface;
   a body panel including a cantilevered portion, the cantilevered portion including a tab projecting from an interior side of the cantilevered portion, wherein the tab is configured to be slidably disposed adjacent the first guide surface to locate the cantilevered portion relative to the light unit.

2. The light assembly of claim 1, wherein the cradle includes a second guide surface, and wherein the tab is configured to slidably engage a slot defined by the first and second guide surfaces.

3. The light assembly of claim 1, wherein a width of the slot decreases along a length of the slot extending in a direction in which the tab is configured to be slid.

4. The light assembly of claim 1, wherein the tab includes a contact portion spaced apart from the first guide surface in a direction perpendicular to the first guide surface by a predetermined distance, the contact portion configured to contact the first guide surface to prevent movement of the cantilevered portion in the direction beyond the predetermined distance.

5. The light assembly of claim 4, wherein the first guide surface includes a ridge extending a length of the guide surface, the ridge configured to be contacted by the tab to prevent movement of the cantilevered portion beyond a predetermined distance in a direction perpendicular to the ridge.

6. The light assembly of claim 1, wherein the housing includes an elongated platform including a portion extending substantially parallel to an adjacent portion of the lens, wherein the lens is attached to the elongated platform, and wherein the guide surface and cantilevered portion are on opposing sides of the platform.

7. The light assembly of claim 1, wherein the cradle is formed separately from the housing.

8. A light assembly for a vehicle comprising:
   a housing;
   a cradle attached to the housing and including a slot defined by two spaced apart surfaces;

a lens attached to the housing and having a primary light emitting surface and a secondary light emitting surface at an angle relative to the primary surface, the secondary surface including two spaced apart projections separated by a recess;

a body panel attached to the housing and having a side panel including a substantially V-shaped edge defining an outthrust, the outthrust having a portion that is substantially flush with at least a portion of the secondary surface, the body panel also including a tab projecting from the outthrust and slidably engaged with the slot.

9. The light assembly of claim 8, wherein the housing includes an elongated platform extending adjacent to at least one of the projections, wherein the cradle is attached to the housing adjacent the platform.

10. The light assembly of claim 9, wherein at least one of the projections is joined to the platform, and wherein the tab includes a first portion extending over the platform and a second portion at angle to the first, the second portion engaging the slot.

11. The light assembly of claim 9, wherein the lens includes a flange that is glued to the housing along the platform.

12. The light assembly of claim 8, wherein the tab projects from adjacent a vertex of the outthrust.

13. The light assembly of claim 8, wherein a portion of the tab slidably engaged with the slot includes a bend extending substantially parallel to a length of the slot and wherein the slot includes a ridge extending the length of the slot, the ridge disposed adjacent the bend when the tab is engaged with the slot.

14. The light assembly of claim 8, wherein the cradle is a separate piece contoured to the shape of the light assembly.

15. The light assembly of claim 8, wherein the slot is wider than the width of the tab by a predetermined amount.

16. The light assembly of claim 8, wherein the body panel includes a first portion extending in a first vehicle direction and a second portion extending in a second vehicle dimension, and wherein the body panel and tab are part of a single piece of stamped sheet metal.

17. The light assembly of claim 8, wherein the tab includes a bend substantially perpendicular to a length of the slot.

18. A cradle for securing a tab projecting from an outthrust defined by a V-shaped edge of a body panel to a light assembly on a vehicle, the cradle comprising:

a first portion contoured to the shape of the light assembly, the first portion configured to be attached to the light assembly; and a second portion including two spaced apart surfaces defining a slot, the slot configured to be engaged by the tab.

19. The cradle of claim 18, wherein a width of the slot decreases along a length of the slot extending in a direction in which the outthrust is configured to be slid.

20. The cradle of claim 19, wherein the slot includes a ridge extending a length of the slot.

* * * * *